(12) United States Patent
Vieth

(10) Patent No.: US 8,590,292 B2
(45) Date of Patent: Nov. 26, 2013

(54) MOTOR VEHICLE HAVING A SYSTEM FOR FEEDING FLUID INTO ANOTHER MEDIUM, PARTICULARLY FOR FEEDING A REDUCING AGENT INTO THE EXHAUST GAS OF AN INTERNAL COMBUSTION ENGINE

(75) Inventor: Siegfried Vieth, Ludwigsburg (DE)

(73) Assignee: Daimler AG, Stuttgart (DE)

( * ) Notice: Subject to any disclaimer, the term of this patent is extended or adjusted under 35 U.S.C. 154(b) by 340 days.

(21) Appl. No.: 12/993,060

(22) PCT Filed: Sep. 4, 2009

(86) PCT No.: PCT/EP2009/006435
§ 371 (c)(1),
(2), (4) Date: Apr. 18, 2011

(87) PCT Pub. No.: WO2010/034401
PCT Pub. Date: Apr. 1, 2010

(65) Prior Publication Data
US 2011/0179772 A1    Jul. 28, 2011

(30) Foreign Application Priority Data
Sep. 26, 2008  (DE) .......................... 10 2008 049 097

(51) Int. Cl.
*F01N 3/00*    (2006.01)

(52) U.S. Cl.
USPC .................. 60/295; 60/298; 60/301; 137/339

(58) Field of Classification Search
USPC .............................. 60/274–324; 137/399, 340
See application file for complete search history.

(56) References Cited

U.S. PATENT DOCUMENTS

| 5,884,475 | A  | * | 3/1999 | Hofmann et al. ............... 60/274 |
| 6,209,315 | B1 |   | 4/2001 | Weigl |
| 6,279,603 | B1 |   | 8/2001 | Czarnik et al. |
| 6,399,034 | B1 | * | 6/2002 | Weisweiler ................ 423/213.2 |
| 6,810,661 | B2 | * | 11/2004 | Lambert et al. ................. 60/286 |
| 6,814,303 | B2 | * | 11/2004 | Edgar et al. .................... 239/128 |

(Continued)

FOREIGN PATENT DOCUMENTS

| CN | 1909951 A | 2/2007 |
| DE | 198 19 579 C1 | 9/1999 |

(Continued)

OTHER PUBLICATIONS

English Translation of Chinese Office Action (five (5) pages).

(Continued)

*Primary Examiner* — Thomas Denion
*Assistant Examiner* — Jesse Bogue
(74) *Attorney, Agent, or Firm* — Crowell & Moring LLP

(57) ABSTRACT

In a system for feeding fluid into an exhaust gas after-treatment system, during operation fluid is fed via a feed line of the dispensing unit from a main container and is partially returned via a return line to the main container. A diaphragm pressure container is provided on the feed line downstream of a pump and a non-return valve toward the dispensing unit. During operation of the pump, the diaphragm pressure container is filled with fluid. The diaphragm pressure container is emptied as soon as the pump stops operating. In this way, the dispensing unit is cooled even after the operation of the system has ended, thereby protecting electronic components of the same from overheating.

12 Claims, 1 Drawing Sheet

(56) References Cited

U.S. PATENT DOCUMENTS

Figure 1:
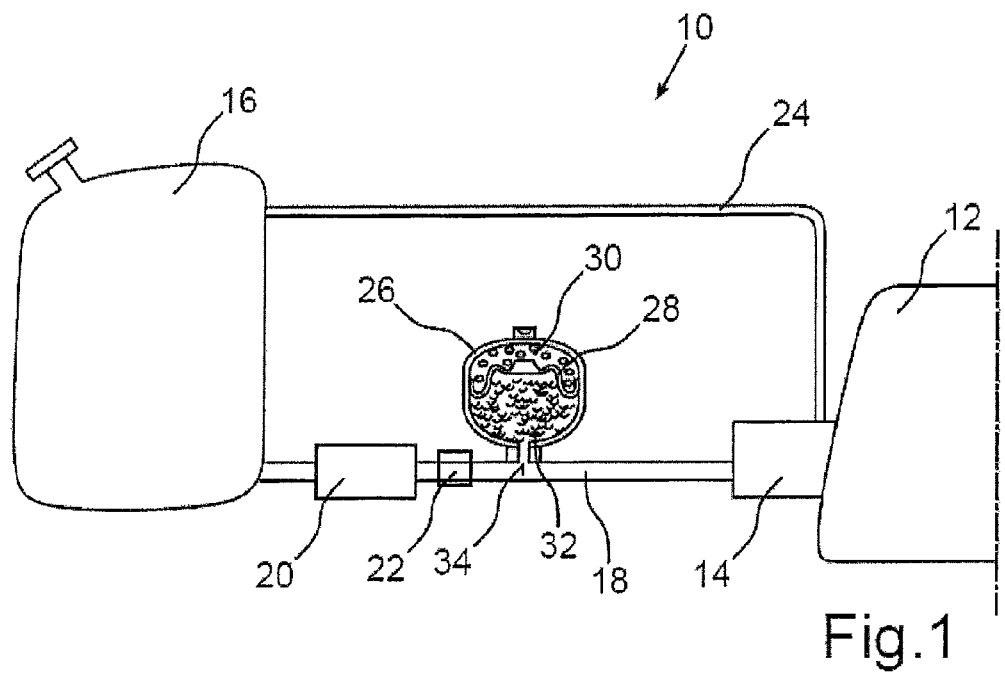

| | | | |
|---|---|---|---|
| 7,454,898 B2* | 11/2008 | Allgeier et al. | 60/286 |
| 7,594,393 B2* | 9/2009 | Offenhuber et al. | 60/286 |
| 2005/0252201 A1* | 11/2005 | Lecea et al. | 60/286 |
| 2007/0163239 A1* | 7/2007 | Hofmann et al. | 60/286 |
| 2007/0212287 A1 | 9/2007 | Brunengo | |
| 2008/0041037 A1* | 2/2008 | Kass et al. | 60/286 |
| 2009/0205316 A1* | 8/2009 | Dougnier et al. | 60/274 |

FOREIGN PATENT DOCUMENTS

| | | |
|---|---|---|
| DE | 103 24 482 A1 | 12/2004 |
| DE | 10 2007 000 666 A1 | 7/2008 |
| EP | 1 236 499 A1 | 9/2002 |
| NL | 1016384 C2 | 4/2002 |
| WO | WO 96/08639 A1 | 3/1996 |

OTHER PUBLICATIONS

International Search Report including partial English translation dated Oct. 23, 2009 and PCT/ISA/237 Form (Fifteen (15) pages).

Chinese-language Office Action dated Apr. 3, 2013 with English translation (Thirteen (13) pages).

* cited by examiner

MOTOR VEHICLE HAVING A SYSTEM FOR FEEDING FLUID INTO ANOTHER MEDIUM, PARTICULARLY FOR FEEDING A REDUCING AGENT INTO THE EXHAUST GAS OF AN INTERNAL COMBUSTION ENGINE

CROSS REFERENCE TO RELATED APPLICATIONS

This application is a national stage of PCT International Application No. EP 2009/006435, flied Sep. 4, 2009, and claims priority under 35 U.S.C. §119 to German Patent Application No. 10 2008 049 097.0, filed Sep. 26, 2008, the entire disclosures of the afore-mentioned documents are herein expressly incorporated by reference.

BACKGROUND AND SUMMARY OF THE INVENTION

The present invention relates to a motor vehicle with a system (or a device) for feeding fluid into another medium. The present invention can be used for introduction of a fluid into the exhaust gas of an internal combustion engine of the motor vehicle. The fluid is typically a reducing agent, but it can also be fuel.

The fluid is introduced into the exhaust gas for reducing the toxic substances contained in the exhaust gas of the internal combustion engine, particularly the nitrogen oxides. This is particularly sensible if the internal combustion engine is operated with an air excess, as is the case, for example, with a diesel and a lean engine. A substance releasing ammonia is introduced into the exhaust gas, typically urea, which is provided in an aqueous solution. Ammonia results with a reaction of the urea with the water. This ammonia is converted with nitrogen monoxide and nitrogen dioxide to molecular nitrogen and water by selective catalytic reduction.

The dispensing unit, via which the fluid is introduced into the exhaust gas, is usually coupled to the exhaust gas system and can thus heat considerably. A main container for the fluid is arranged far enough away from the dispensing unit that the fluid in the main container is not heated. The main container is coupled to the dispensing unit via a feed line. It is known to use the fluid itself for cooling the dispensing unit. A return line is provided for this cooling, via which the dispensing unit is coupled to the container. Accordingly, more fluid can be guided to the dispensing unit and the fluid that is not dispensed is then returned to the container, which fluid absorbs heat from the dispensing unit and thus cools this.

Such a system for feeding fluid into another medium is described in DE 103 244 82 A1. In the device for dosing a reducing agent to the exhaust gas of an internal combustion engine disclosed in this specification, the fluid to be dispensed is also guided past the dispensing unit, and the return line has a branch-off, at which the reducing agent is removed from the return line in order to be dispensed by the dispensing unit. The reducing agent that is not taken out is returned to the main container.

WO 96/08639 A1 discloses rinsing the lines of a device for introducing fluid into an exhaust gas treatment system after the termination of its operation using a pressurized gas, and this prevents freezing of feed line with cold ambient temperatures. It is presumed that the entire device for introducing fluid into an exhaust gas treatment system can be coupled to a pressurized air system which is available in commercial vehicles.

In the meantime, providing a coupling with a pressurized air system with devices for introducing fluid into the exhaust gas of an internal combustion engine has been abandoned. As such, a pressurized air system is partially not even present in motor vehicles, in which such a device is used.

During the operation of a system for feeding fluid into another medium, the fluid is typically fed through a unit (e.g., a pump), which operates with electrical current. It is possible that no current is available for a period of time For example, with vehicles carrying dangerous goods, an electric switch is provided which switches off under certain circumstances. With a sudden stop of the system, the dispensing unit receives heat, particularly if it is coupled to an exhaust gas aftertreatment unit. The dispensing unit usually has electronic components which control the valves in such a manner that a certain dispensing amount is dispensed. These electronic components can overheat and can be damaged.

Exemplary embodiments of the present invention provide a motor vehicle with a system for feeding fluid into another medium. The system includes a main container for fluid, a dispensing unit, connected to the main container via a feed line, which dispenses fluid to the other medium, wherein the dispensing unit is coupled to the main container via a return line to feed fluid back thereto, and a further container fluidly accessible by an opening in the feed line.

Exemplary embodiments of the present invention also provide a method for operating a system. The method involves feeding fluid from a main container to a dispensing unit, partially dispensing the fluid by the dispensing unit to another medium outside the system and returning a part of this fluid that is not dispensed to the main container via a return line. During an operation where the dispensing takes place, fluid is guided past the dispensing unit after the termination of the dispensing operation.

Exemplary embodiments of the present invention provide for protection of the dispensing unit, particularly these electronic components, with a motor vehicle according to the preamble of claim 1. This object is solved by a motor vehicle with the characteristics according to claim 1 and a method for operating a system for feeding fluid into another medium outside the system according to claim 10.

In accordance with exemplary embodiments of the present invention a motor vehicle includes a further container for fluid that accessible from an opening in one of the lines for fluid.

While the main container for the fluid is arranged remote from the dispensing unit, the further container can be arranged closer to the dispensing unit due to its coupling to the feed line or also the return line. It can now be affected by a suitable measure that the container empties automatically after the termination of the operation. This can, for example, take place in a simple manner in that the container is arranged in such a manner that it empties due to gravity. When emptying the further container, fluid is moved through the lines, particularly past the dispensing unit, and the dispensing unit is thus cooled.

The container can principally empty into the return line and affect a suction, which sucks fluid from the feed line past the dispensing unit. The further container is, however, coupled to the feed line, and the fluid from the container presses fluid through the feed line past the dispensing unit into the return line and from this into the main container.

The pressing of fluid from the container can take place such that a corresponding pressure is provided by a mechanism that operates in a currentless manner. This mechanism can continuously provide a pressure acting on the fluid in the container, and, during the operation of the system, a counter-pressure to the same pressure is generated. After the termination of the operation, a counter-pressure does not exist, and the pressure provided by the mechanism operating in a currentless manner presses the fluid out.

The counter-pressure can be applied by a pump. So that this pump does not interfere after the termination of the operation, it can be arranged between the main container and the further container, and a non-return valve is arranged between the pump and the further container. The pump feeds fluid from the main container to the dispensing unit and generates pressure, through which the non-return valve is opened. As soon as the current supply terminates, the pump no longer generates pressure, the non-return valve closes and fluid can be pressed out from the further container.

It is particularly efficient if the further container is formed as a pressure container. The means for providing the pressure pressing the fluid out from the container are then effectively the container itself and a medium under pressure present therein, typically a gas. An embodiment of a pressure container that is constructed in a particularly simple manner and thus cost-efficient is a diaphragm pressure container. With a diaphragm pressure container, a diaphragm separates a gas chamber from a fluid chamber. In combination with the above-mentioned pump, fluid is pressed into the diaphragm pressure container and the diaphragm reduces the chamber available for the gas, which is compressed due to the fluid pressure. After the termination of the operation of the pump, the gas relaxes, the gas chamber increases and the space in the diaphragm pressure container available for the fluid reduces correspondingly, fluid is thus pressed out of the diaphragm pressure container.

As has already been mentioned, the system for feeding fluid into another medium can operate in the manner without pressurized gas. Either no pressure gas system is present in the motor vehicle, or, if it is present, it is not coupled to the system for feeding fluid. It is preferably the feed pump which feeds the fluid from the main container to the dispensing unit and possibly back again to the main container, and a pressurized gas is not necessary to move the fluid. The gas present in the diaphragm pressure container shall not fall under the term of the pressurized gas, as it does not serve for a continuous fluid feed during normal operation.

As has already been mentioned, the system can be coupled to an exhaust gas system (exhaust gas aftertreatment unit) connected downstream of an internal combustion engine of the motor vehicle in order to introduce fluid into the exhaust gas. As mentioned at the outset, this fluid is typically aqueous urea solution, so that the main container can be filled with such a urea solution.

The system according to the invention for operating a system, in which fluid from a main container is fed to a dispensing unit and is at least partially dispensed from the dispensing unit to another medium outside the system, wherein a part not dispensed is fed back to the main container via a return line, operates such that during an operation in which the dispensing takes place, in which the fluid is moved by a device running with electric current, fluid is guided past the dispensing unit after the termination of this operation, which can coincide with a termination of the availability of electrical current.

With the method according to the invention, at a time when the energy is available for this (in the form of electrical current), it is provided for the case that this is no longer available.

During an operation when the dispensing takes place, that is, the fluid is moved e.g., through a pump, fluid is stored in a further container (thus introduced therein), wherein the further container is designed in such a manner that fluid is automatically fed from the further container after the termination of this operation. A diaphragm pressure container is suitable for this, as already mentioned above.

BRIEF DESCRIPTION OF THE DRAWING FIGURES

Figure 2:
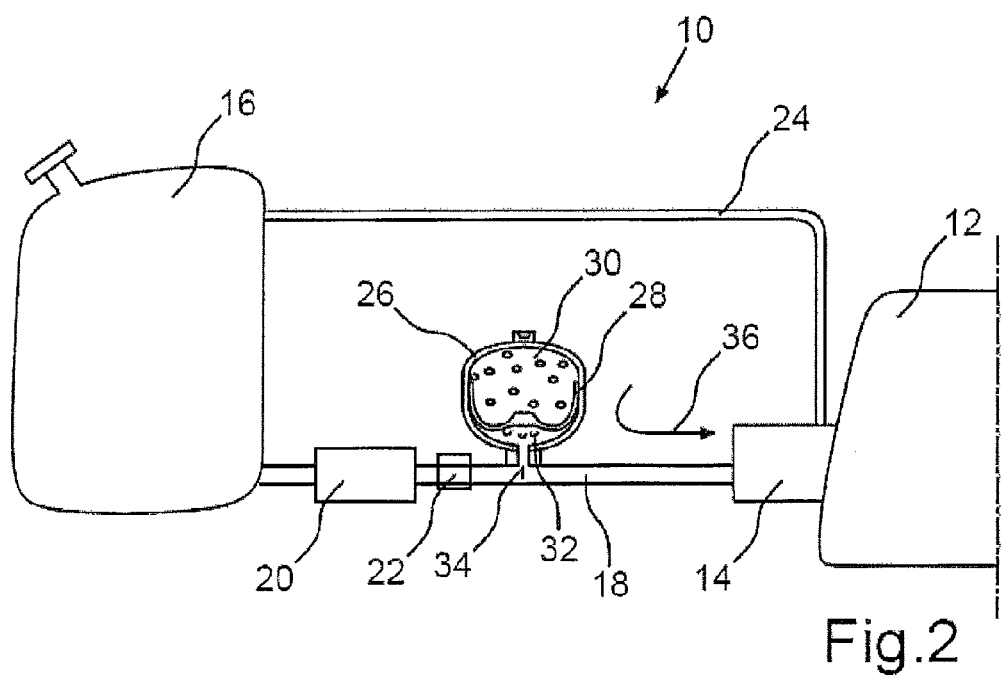

In the following, a preferred embodiment of the invention is described with regard to the drawing, in which FIG. 1 is schematically illustrates the assembly of a system for introducing urea solution into an exhaust gas aftertreatment unit with the system in a first operating state and FIG. 2 illustrates the system of FIG. 1 in a second operating state.

DETAILED DESCRIPTION OF THE DRAWING FIGURES

A system 10 for introducing urea into an exhaust gas aftertreatment unit is coupled to an exhaust gas aftertreatment unit 12, and a dispensing unit 14 of the system 10 is coupled to the exhaust gas aftertreatment unit 12. An aqueous urea solution is stored in a main container 16. This main container 16 is coupled to the dispensing unit 14 via a feed line 18. A pump feeds aqueous urea from the main container 16 to the dispensing unit 14. A non-return valve 22 is connected downstream of the pump 20 in the direction toward the dispensing unit 14. This non-return valve closes as soon as the pump is no longer operated. A return line 24 leads back to the container 16 from the dispensing unit 14. There is always or repeatedly a part of aqueous urea solution, which is fed from the main container 16 to the dispensing unit 14 and is subsequently returned. This part cools the dispensing unit 14. A cooling of the dispensing unit 14 is advantageous, as the exhaust gas treatment unit 12 often becomes very hot during operation.

A diaphragm pressure container 26 is coupled to the feed line 18. As is usual with diaphragm pressure containers, a diaphragm 28 separates two chambers from each other, namely a chamber 30, in which the gas is present, which can normally not escape from the diaphragm pressure container 26, and a chamber 32, which can be accessed by an opening 34 in the feed line 18, and in which fluid is present, presently aqueous urea solution. During the operation of the device 10, the pump 20 generates a high pressure, and fluid is pressed into the diaphragm pressure container 26, wherein the diaphragm 28 moves in such a manner that the chamber 30 for the gas is decreased and the gas is compressed under the pressure. If the operation of the pump 20 is now terminated, which can happen abruptly, for example when the device 10 is used in a vehicle for dangerous goods, in which an electric switch centrally switches off the current supply of all users of the current supply, the non-return valve 22 closes. The gas under pressure present in the chamber 30 can then relax, it thus presses the diaphragm 28 from the position shown in FIG. 1 into the position shown in FIG. 2, whereby the chamber 32 for the fluid reduces and fluid is thus pressed out. As the non-return valve 22 is closed, the fluid is pressed to the dispensing unit 14 corresponding to the arrow 36 and from this to the main container 16 via the return line. Thus, a volume flow is still in the entire system, particularly past the dispensing unit 14, which cools the dispensing unit 14 further after the termination of the operation of the pump 20. Thereby, electronic components in the dispensing unit 14 are protected from overheating.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A motor vehicle with a system for feeding fluid into another medium, wherein the system comprises:
   a main container for fluid;
   a dispensing unit, connected to the main container via a feed line, that dispenses fluid to the other medium, wherein the dispensing unit is coupled to the main container via a return line to feed fluid back thereto, and wherein the dispensing unit is physically and thermally coupled to an exhaust gas treatment unit so that dispensing unit receives heat from the exhaust gas treatment unit; and
   a further container fluidly accessible by an opening in the feed line, wherein the further container is physically configured so that fluid stored in the further container that is received from the feed line automatically empties from the further container after fluid is no longer provided from the main container to the dispensing unit in such a way that the automatically emptied fluid from the further container passes to the dispensing unit then through the return line and then to the main container so as to cool the dispensing unit.

2. The motor vehicle according to claim 1, wherein the further container is coupled to the feed line.

3. The motor vehicle according to claim 1, further comprising:
   a mechanism that operates without current, provides pressure acting on the fluid in the further container and presses the fluid out in the absence of a counterpressure.

4. The motor vehicle according to claim 1, further comprising:
   a pump arranged between the main container and the further container for feeding fluid from the main container to the dispensing unit; and
   a non-return valve between the pump and the further container.

5. The motor vehicle according to claim 1, wherein the further container is a pressurized tank.

6. The motor vehicle according to claim 5, wherein the further container is a diaphragm pressure container with a diaphragm separating a gas chamber from a fluid chamber in which the fluid is stored.

7. The motor vehicle according to claim 1, wherein the system operates in an non-pressurized manner to affect operation of the dispensing of fluid without pressurized gas.

8. The motor vehicle according to claim 1, wherein the system is coupled to an exhaust gas aftertreatment unit of the motor vehicle connected downstream of the internal combustion engine of the motor vehicle in order to introduce fluid into the exhaust gas.

9. The motor vehicle according to claim 1, wherein the main container is filled with urea solution.

10. A method for operating a system, comprising:
    feeding fluid from a main container to a dispensing unit;
    storing at least some of the fluid from the main container in a further container;
    partially dispensing the fluid by the dispensing unit to another medium outside the system; and
    returning a part of this fluid that is not dispensed to the main container via a return line,
    wherein, during an operation where the dispensing takes place, a pump is operational to guide fluid past the dispensing unit, and
    wherein when the pump is switched off and fluid is no longer fed from the main container, fluid stored in the further container automatically empties from the further container, passes through the dispensing unit and then is returned, via the return line, to the main container so as to cool the dispensing unit.

11. The method according to claim 10, wherein during the dispensing operation, fluid is stored in a further container that automatically feeds the fluid from the further container after the termination of the dispensing operation.

12. The method according to claim 11, wherein the further container is a diaphragm pressure container with a diaphragm separating a gas chamber from a fluid chamber in which the fluid is stored.

* * * * *